United States Patent [19]

Janes

[11] Patent Number: 4,651,100

[45] Date of Patent: Mar. 17, 1987

[54] ANTENNA CONSTRUCTION FOR WELL LOGGING OF SUBSURFACE EARTH FORMATIONS

[75] Inventor: Thomas A. Janes, Houston, Tex.

[73] Assignee: Dresser Industries, Inc., Dallas, Tex.

[21] Appl. No.: 642,279

[22] Filed: Aug. 20, 1984

[51] Int. Cl.$^4$ .......................... H01Q 1/04; G01V 3/30
[52] U.S. Cl. ..................................... 324/338; 343/719
[58] Field of Search ............... 343/789, 719; 324/338, 324/339, 340, 341

[56] References Cited

U.S. PATENT DOCUMENTS

| | | | |
|---|---|---|---|
| 2,431,124 | 11/1947 | Kees et al. | 343/789 |
| 3,441,937 | 4/1969 | Clasby et al. | 343/789 |
| 3,944,910 | 3/1976 | Rau | 324/6 |
| 4,052,662 | 10/1977 | Rau | 324/6 |
| 4,077,003 | 2/1978 | Rau | 324/6 |
| 4,319,191 | 3/1982 | Meador et al. | 324/341 |
| 4,338,567 | 7/1982 | Coates | 324/338 |
| 4,383,220 | 5/1983 | Baldwin | 324/338 |
| 4,511,842 | 4/1985 | Moran et al. | 324/338 |

OTHER PUBLICATIONS

"Electromagnetic Propagation . . . a New Dimension in Logging", Calvert, Rau and Wells, SPE 6542, Apr. 13, 1977.
"Dielectric Constant Logging, A Salinity Independent Estimation of Formation Water Volume", Meador and Cox, SPE 5504, Sep. 28, 1975.
"Advancements in Electromagnetic Propagation Logging", Wharton et al., SPE 9041, May 14, 1980.
"Dielectric Logging", Oliver, Dresser Industries, Inc. publication.
"Dielectric Log", Dresser Industries, Inc. brochure, 1981.

Primary Examiner—Eli Lieberman
Attorney, Agent, or Firm—Patrick H. McCollum

[57] ABSTRACT

Antenna apparatus for use in introducing electromagnetic energy into subsurface earth formations and acquiring measurements relating to propagation of such energy therethrough. Antenna construction includes a resonant cavity-backed slot, the cavity being filled with a fluid. The slot receives an insulator plug serving as a floating piston whereby pressure differentials between the cavity and the surrounding borehole are accommodated. A metallic strap within the cavity grounded at one end to the tool body interconnects at the other end to a matching and tuning feed network. A lumped element resonant circuit behind the slot is thereby formed for either radiating or receiving transmitted or received electromagnetic energy, respectively.

26 Claims, 8 Drawing Figures

ANTENNA CONSTRUCTION FOR WELL LOGGING OF SUBSURFACE EARTH FORMATIONS

BACKGROUND OF THE INVENTION

This invention relates to apparatus for investigating subsurface earth formations with electromagnetic energy, and, more particularly, to antenna apparatus for use in downhole logging tools to investigate properties of such formations.

An open hole logging technique has long been desired in the search for oil and gas which would assist in determination of total formation water volume or saturation. One purpose of this is to differentiate water and oil zones to determine whether a formation should be primarily water or hydrocarbon bearing. For example, by measuring formation porosity, which responds to total fluid content, hydrocarbon fluid volume may be approximated by subtracting the bulk water volume.

In the past bulk volume of water was measured by relying on the difference in resistivity between water and hydrocarbon bearing formations. Thus, technology known as resistivity logging was developed for measuring such formation resistivity differences by a variety of techniques. For example, induction logging sought to measure electrical conductivity of formations by inducing currents of relatively low frequency on the order of 20,000 Hz into the formation and measuring the return current.

A problem arises however when water salinity is rather low. This contrast between resistivity of water bearing and other formations was exhibited only with relatively saline water and was greatly diminished with fresh formation water. Accordingly, conventional resistivity logging instruments had difficulty in differentiating hydrocarbon and fresh-water bearing intervals, and other techniques were thus sought after.

One method which has met with some success, known as dielectric logging, seeks to measure the dielectric constant or permitivity of formations. Although at 20 KHz, the electromagnetic field in a borehole is relatively independent of the dielectric constant, at frequencies above 10 MHz the influence of dielectric properties of the formation on electromagnetic energy becomes significant. More importantly, however, this parameter has been shown to be substantially constant for water of varying degrees of salinity but substantially variable from that of other formation materials commonly encountered.

For example, at 47 MHz, the dielectric constant is approximately 81 for fresh water, and 78 for saline water (105 ppm), whereas the dielectric constants for oil, limestone, and shale, are approximately 2–4, 6–8, and 10–15, respectively.

From the foregoing, it can be appreciated that measurement of relative dielectric constants of formations by logging instruments might be employed to good effect to obtain reliable estimates of water saturation even for areas of brackish or low formation water salinity. The dielectric log was thus useful where resistivity logs are inadequate.

The technique of measuring electrical permittivity or the dielectric constant of a formation basically involved measuring the travel time (or alternatively the phase shift) and the attenuation of an electromagnetic field propogating through the formation with a known angular frequency. General discussion of the fundamental principles and apparatus conventionally employed in this type of logging may be found, for example, in U.S. Pat. No. 3,944,910 to Rau, and in a technical bulletin entitled "Dielectric Log", pages 1–9, copyright 1981 by Dresser Atlas, Dresser Industries, Inc., which are herein incorporated by reference.

The dielectric constant of a lossy material can be expressed as a complex quantity of the form $\epsilon^* = \epsilon' + j\epsilon''$, wherein $\epsilon'$ represents the "true" dielectric constant of the materials in lossless form (e.g., displacement currents for a particular electric field if lossless), and $\epsilon''$ represents the "loss factor" of the material (losses due to conduction and relaxation effects, e.g., dipolar relaxation losses).

However, it has long been known in the art that subsurface formation materials have appreciable conductivity. Therefore, oftentimes $\epsilon''$ is significantly greater than $\epsilon'$. Because $\epsilon''$ is thus necessarily measured to some extent in subsurface formations when attempts are made to measure $\epsilon'$, accuracy of this measurement of $\epsilon$ has frequently been found difficult.

A "loss tangent" term has been known to contribute to this loss factor term $\epsilon''$. The term may be thought of as a ratio of lossy conduction current ($\sigma$) to displacement current ($\omega\epsilon$), e.g., a measurement of relative conduction losses, and may be found defined in the literature as:

$$\text{Loss Tangent} = \sigma/\omega\epsilon$$

From the foregoing, it may be seen that when $\sigma$ is relatively small, this loss tangent may be for practical purposes neglected in a measurement of $\epsilon'$. However, when $\sigma$ becomes significant as in the case of typical well logging conditions, this loss tangent may be kept low in order to permit measurement of $\epsilon'$ and to neglect the effects of $\epsilon''$ by making the measurement frequency $\omega$ large. Thus, as $\omega$ goes above 500 MHz, $\epsilon'$ becomes increasingly greater than $\epsilon''$ so that reliable measurements of $\epsilon'$ become possible. As this $\omega$ goes even higher into the GHz range, $\epsilon'$ becomes substantially greater than $\epsilon''$.

This would suggest using as an investigation frequency of the propagating electromagnetic wave the highest frequency possible. However, several problems have been encountered for extremely high frequencies of investigation. For example, in approaching the GHz range, the wavelength $\lambda$ of the propagating electromagnetic energy is very small and can approach the thickness of mudcake encountered in the borehole. In these circumstances, the mudcake has been found to act in the manner of a wave 9uide in propagating a portion of the transmitting energy. Accordingly, this decreases the amount of energy available to flow out into and through the formation of interest, known as the lateral wave. It will be recalled that it is the attenuation and phase difference encountered in this wave traversing a portion of the borehole of interest which is required to derive a reliable measurement of the dielectric constant of that material through which the lateral wave travels.

Notwithstanding the foregoing, attempts have nevertheless been made to develop a successful logging technique for operating at frequencies as high as 1.1 GHz as in the case of the aforementioned patent to Rau.

In the use of extremely high investigation frequencies, it is conventional to provide as transmitting and receiving antennas for such electromagnetic energy antennas known as resonant cavities which are loaded up with a dielectric material so as to resonant at the desired frequency. At a frequency of 1.1 GHz a half wave length is approximately 12 in. or 7.5 cm in length. In accordance with microwave theory, it is known that a cavity having dimensions approximating the half wave length may be made to resonant efficiently. Unfortunately, due to the physical constraints of logging tools, antennas having half wave length dimensions were obviously impracticable.

However, it has also long been known in the art that the required cavity dimensions for efficient radiation may be reduced by loading up the cavity with a dielectric material. In this manner the cavity dimension may be reduced by a factor of $1/\sqrt{\epsilon}$, whereby a cavity dimension would thereby become $\lambda/2\sqrt{\epsilon}$. In the example under consideration a 12 in. cavity may thus be reduced in size to a loaded cavity of more reasonable proportion of 3 in. by filling the cavity with a dielectric material having a dielectric constant of 16 (i.e., $3''=12''/\sqrt{16}$). In particular, with respect to an embodiment depicted in the '910 patent, a cavity was in fact provided fed by a probe in which the cavity was entirely filled with a material having a dielectric constant of 4. This provided a cavity of reasonable dimension resonating for maximum pick up and transmission at the desired frequency.

At lower frequencies such as a nominal frequency of 200 MHz, the half wave length is approximately 30 in. Still operating under the physical constraint of reasonable logging tool dimensions, in order to reduce the cavity size by a factor of ten from 30 in. to 3 in., based on the foregoing relation, this would require a loaded resonant cavity wherein the dielectric material had a dielectric constant of 100 (i.e., $\sqrt{\epsilon}=10$). However, in practice, it is extremely difficult to provide an appropriate material for filling the cavity having a dielectric constant of 50 or greater let alone one which provided a constant on the order of 100 or the like.

Yet another problem with cavity backed slot antenna design suitable for use in dielectric logging is the necessity for accommodating tremendous pressure differentials which may exist between the cavity and the borehole, such differentials at times equaling or exceeding 20,000 psi. With respect to the loaded resonant cavity approach for extremely high investigating frequencies wherein such loading is possible, this problem has not so substantial inasmuch as the cavity openings could be filled with a water-tight ceramic insulating material having the appropriate dielectric constant filling the cavity and the antenna slot. However, in the lower frequencies such sealing frequently became a serious problem.

The disadvantages of the prior art are overcome by the present invention and an improved antenna apparatus for use downhole in the well logging of subsurface earth formations is hereinafter disclosed, including a novel transmitter and receiver antenna assembly construction with improved pressure sealing characteristics.

SUMMARY OF THE INVENTION

Antenna apparatus is provided for use in introducing electromagnetic energy into subsurface earth formations and acquiring measurements relating to propagation of such energy therethrough. Antenna construction includes a resonant cavity-backed slot, the cavity being filled with a low loss fluid or semi-fluid such as silicon grease. The slot receives an insulator plug serving as a floating piston whereby pressure differentials between the cavity and the surrounding borehole are accommodated. A metallic strap within the cavity grounded at one end to the tool body interconnects at the other end to a matching and tuning feed network. The network is interconnected to a downhole source of electromagnetic energy or alternatively to appropriate receiver circuitry. A lumped constant or element resonated cavity-backed slot antenna is thereby formed for either radiating or receiving transmitted or received electromagnetic energy, respectively.

According to one embodiment of the present invention a generally cylindrical cavity is provided in an antenna housing which may be positioned so as to place the transmitter and receiver antennas in the housing adjacent the borehole wall. Inside the cavity, a plastic cylindrical filler plug is placed having a rectangular groove in the upper face thereof which carries a mating strap of conductive metal. One end of the strap is grounded to the housing. A ceramic high pressure-temperature terminal is disposed through the housing terminating in a contact within the cavity. At the other end of the strap adjacent the high pressure-temperature terminal, a matching capacitor is interconnected between the strap end and the contact. A tuning capacitor is also interconnected between the end of the strap and the pressure terminal holder through which the high pressure-temperature terminal is disposed.

Interconnected to the high pressure-temperature terminal end is a run of semi-rigid coax cable. The cable in turn is interconnected to an appropriate transmitter or receiver circuitry depending on whether the antenna assembly is to operate as a transmitting or receiving antenna. An antenna slot element of generally rectangular shape is placed over the cavity. In the element an oblong slot is disposed adjacent and opposed to the strap whereby a resonant cavity-backed slot is thereby provided.

The cavity is fed by interconnecting the coax to an appropriate downhole transmitter operating at a nominal frequency of 200 MHz. Alternatively, downhole receiver circuitry attached to the coax monitors electromagnetic energy returning from the formation picked up by the receiver antenna assembly just described. This energy may be delivered to the formation by the aforementioned transmitter assembly. Accordingly, the cavity resonates about a nominal investigating frequency of 200 MHz.

The slot is filled with a mating plastic antenna insulator plug, and the interstices of the cavity filled with an oil or other suitable fluid. The plug thereby serves as a movable piston whereby pressure differentials between the cavity of the antenna and the borehole are thus compensated for.

More particularly, for each antenna, an inductor, which may take the form of the aforementioned strap or a few turns of wire into a coil, is positioned adjacent the antenna slot. The antennas, in operation, are positioned by means of an antenna housing carrying the antennas against the borehole, and the elongate dimension of the slots are generally oriented perpendicular to a longitudinal X-axis extending through the antenna housing.

With respect to the transmitter antennas, a lumped constant resonating means (which may take the form of the aforementioned discrete capacitive elements) is interconnected between the inductor of the transmitter antenna and an oscillator having a preselected frequency of between 50 MHz to 1 GHz and preferably nominally operating at 200 MHz. This matches the impedance of the oscillator to the antenna and tunes the antenna to a preselected resonant frequency whereby the oscillator frequency is matched to the resonant frequency of the antenna (which is also between 50 MHz to 1 GHz and preferably 200 MHz).

With respect to the receiver antennas, a lumped constant resonating means (which may also take the aforementioned discrete capacitive element form) is interconnected between measuring means and the inductor of the receiving antenna. This matches impedance of the measuring means connected to the antenna itself, and tunes the receiving antenna and the cavity to a preselected resonant frequency between 50 MHz to 1 GHz and preferably to 200 MHz nominally.

The measuring means are comprised of a phase detector interconnected to each receiving antenna for detecting phase differences to electromagnetic energy incident on the receivers, and an amplitude detector also interconnected to each receiver antenna for detecting amplitude of received electromagnetic energy. Processing means connected to the measuring means are provided to determine dielectric constant of the formation adjacent the antenna housing from the phase differences and ratio of the detected amplitudes.

The antennas are preferably spaced along the housing in a line parallel to the aforementioned X axis with two transmitter antennas at either end preferably spaced approximately 23 inches apart and two receiver antennas spaced intermediate thereof and approximately 3 inches apart. In operation, one of the transmitter antennas is periodically energized whereby electromagnetic energy of the preselected frequency is introduced into the formation. Return electromagnetic energy from the formation is monitored by the two receiver antennas, and the resultant phase difference and amplitude of the return energy at the receivers determined by the phase and amplitude detectors, from which the dielectric constant is derived. The preselected frequency of the oscillator, transmitter and receiver antenna resonant frequencies, and the receiving frequency of the measuring means are chosen to be approximately the same within the range of 50 MHz to 1 GHz and preferably 200 MHz. This has been found sufficiently high enough to permit sufficient penetration of the transmitted electromagnetic waves past the mudcake into the invaded zone or even the formation, e.g., as much as 10-12 inches past the borehole, thus avoiding problems in penetrating beyond the mudcake associated with higher frequencies. However, at the same time, such frequency has been found sufficiently low to maintain a low loss tangent such that the imaginery component of dielectric constant may be readily and accurately compensated for.

DETAILED DESCRIPTION OF PREFERRED EMBODIMENTS

Figure 1:
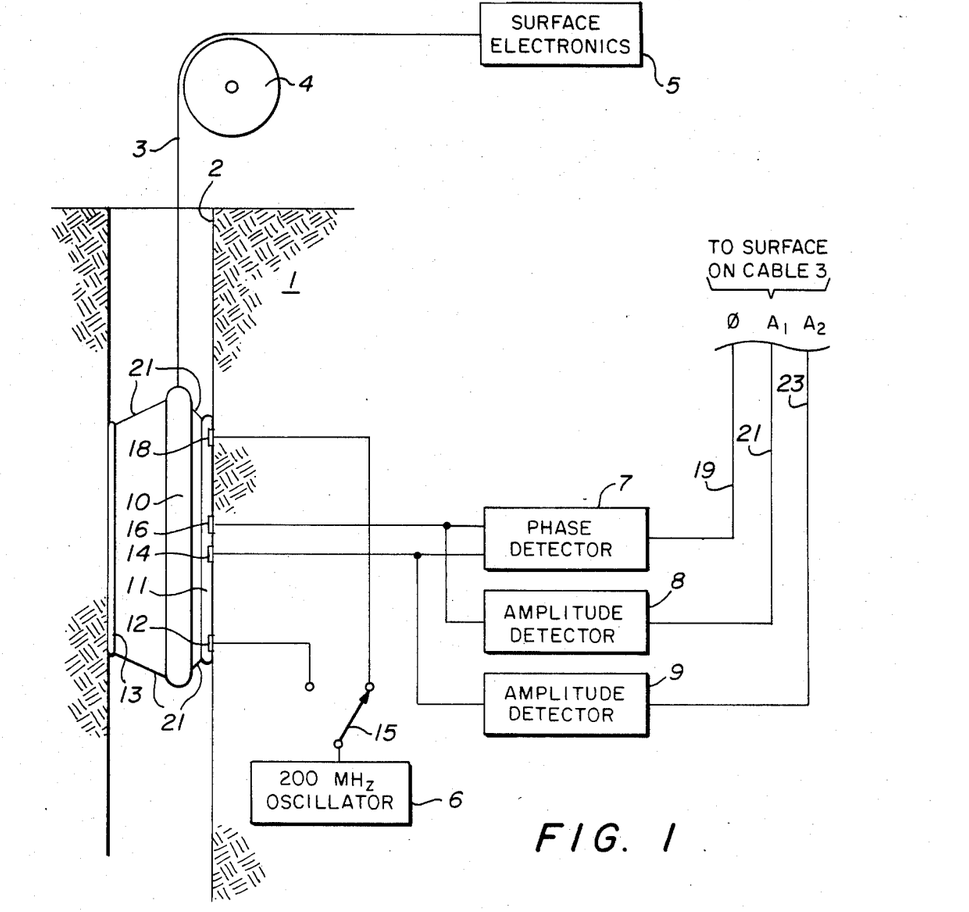
FIG. 1 is a schematic representation, partially in block diagram form, of an embodiment of the invention.

Referring to FIG. 1, depicted therein is a representative embodiment of apparatus in accordance with the present invention for investigating subsurface earth formations 1 traversed by a borehole 2. In operation, apparatus known as a logging tool 10 is suspended within the borehole 2 by means of a logging cable 3. The desired elevation of the tool 10 is controlled by a sheave wheel 4 and suitable means at the surface such as a drum and winch (not shown). The cable 3 includes electrical conductors whereby various electronic equipment within the tool 10 and surface electronics 5 may be in electrical communication. With respect to the logging tool 10 more particularly, such tools are generally comprised of an elongate cylindrical shape forming a fluid-tight housing containing the aforesaid downhole electronics. In the particular dielectric logging tool 10 of the present invention, it is conventional to provide a plurality of vertically spaced transmitter and receiver assemblies 12-18 to be described in greater detail in an antenna housing 11 disposed against the face of the borehole 2 by means of spring-loaded arms 21. In like manner a caliper arm 13 also supported from tool 10 by arms 21 is conventionally provided for insuring engagement of the various antennas 12-18 against the borehole wall, providing indication of borehole diameter and the like. It will be understood that the particular means for effecting such engagement is illustrative and that other appropriate means for accomplishing this objective well known in the art may be employed.

Still referring to FIG. 1, the aforementioned downhole electronics disposed within the tool 10 will now be discussed in greater detail. It will be readily apparent that although such electronics are contained within the tool body 10 they have been depicted at the side thereof for clarity. An oscillator 6 provides electromagnetic energy alternately to transmitter assemblies T1 or 18 and T2 or 12 schematically shown by means of switch 15. A nominal frequency of 200 MHz has been selected for oscillator 6 in the embodiment presently being described. However, it will be appreciated that this frequency may be selected from a suitable range and, accordingly, discussion of the particular frequency choice will hereinafter follow.

Electromagnetic energy from the oscillator 6 which has been delivered to transmitter assemblies 12 and 18 will thence be transmitted into the surrounding formation 1 under investigation and will propagate through the formation 1, arriving at receiver assemblies R1 or 16 and R2 or 14 in due course. The energy thus received by these receivers 14 and 16 is thereafter delivered to a phase detector 7 wherein the difference in phase between the two received signals is detected and an output signal 19 functionally related to the difference delivered on cable 3 to the surface electronics 5. In like manner, the received signals 16 and 14 will be delivered, respectively, to amplitude detectors 8 and 9, whereupon signals 21 and 23 corresponding to these amplitudes are delivered, in like manner, on cable 3 to surface electronics 5.

From the foregoing references which have been incorporated herein by reference, it will be noted that the signals 19–23 may be used in a conventional manner well known in the art of dielectric logging whereby, after appropriate signal processing, a determination may be made of the dielectric constant of the formation 1 under investigation. Accordingly, these references may be referred to for additional information pertinent to this processing and the basic concepts of dielectric logging and, accordingly, will not be discussed in greater detail herein.

Figure 2:
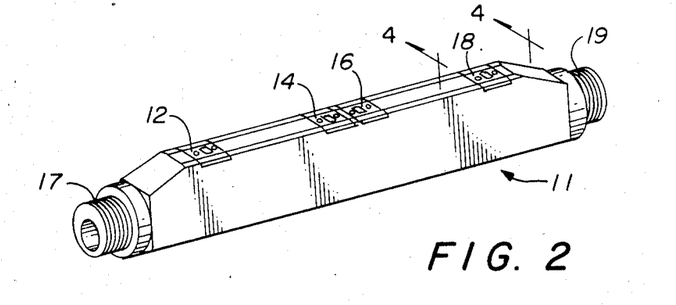
FIG. 2 is a simplified pictorial view of the antenna housing depicted in FIG. 1.

Referring now to FIG. 2, a particular embodiment of the antenna housing 11 of the present invention will be seen. The body 11 may preferably be provided with threaded end portions 17 and 19 for facilitating interconnection to the logging tool body 10 through the spring arms 21. Whereas the various receiver and transmitter assemblies 12–18 may be spatially located at different places within the housing 11, they appear to be of the same general configuration. In fact in the embodiment under discussion the receiving antennas 14 and 16 may preferably be of a similar construction to that of the transmitter antennas 12 and 18. Accordingly, a more detailed discussion of the transmitter antenna assembly 18 will now be provided, with the understanding that such construction may be applied equally as well to the transmitter assembly 12 or the receiver assemblies 14 and 16.

Two transmitting antennas 12 and 18 having slots spaced about 23 in. apart and two receiving antennas 14 and 16 having slots spaced about 3 in. apart are provided, with the antennas 14 and 16 being intermediate of antennas 12 and 18. This forms a differential arrangement common first to acoustic logging whereby investigation is provided of that portion of the formation lying opposite the separation between receiver antennas 14 and 16. Transmitters are alternately energized and for each energization the resultant electromagnetic energy propagated into the formation is detected at both receivers 14 and 16.

More particularly, for each energization, the phase difference between signals detected at the receivers and the amplitude of each such signal are detected for processing. It is well known in the art that this differential arrangement provides compensation for errors in antenna housing tilt, slight instrumentation imbalances, and the like.

In the embodiment depicted in FIG. 2, a slot, to be discussed later, is provided for each antenna 12–18, and the receiver-transmitter separations (measured from the slot centers) are as shown. Relative separation of the antennas 12–18 involves several considerations and trade offs well known in the art which are discussed in the Rau patent. It will be appreciated that such separations may vary in accordance with desired frequency of investigation, expected mudcake thickness ranges, and other parameters as discussed in the above-cited references without departing from the spirit or scope of the present invention. Similarly, nominal dimensions for other components of the antenna construction of the present invention are provided, however the invention is not intended to be so limited and it will be appreciated that such dimensions may be varied in accordance with the teachings of the present inventions to be hereinafter described without departing from the scope or spirit of the invention.

Figure 3:
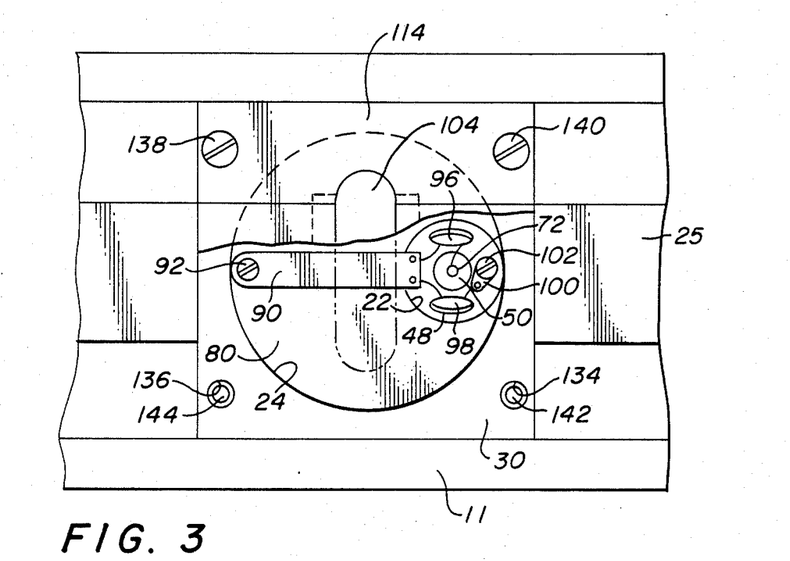
FIG. 3 is a top view partially cut away, depicting a portion of the tool illustrated in FIG. 2.
Figure 4:
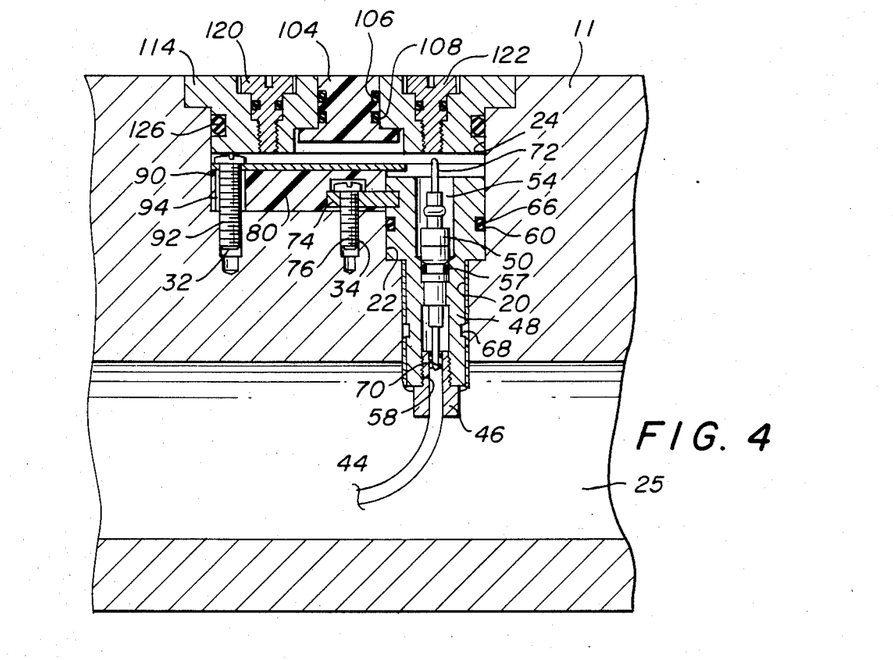
FIG. 4 is a cross-section of a portion of the tool depicted in FIG. 2, partially in section, and taken along lines A—A of FIG. 2.
Figure 8:
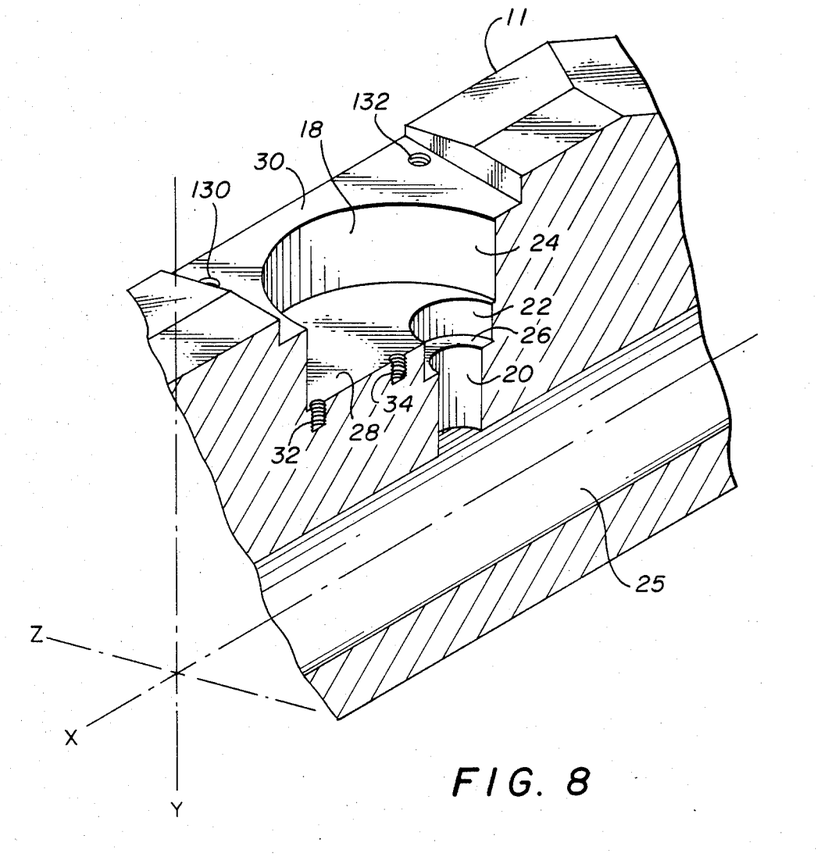
FIG. 8 is a pictorial fragmentary view of a section of the antenna housing depicted in FIG. 2.

Referring now to FIGS. 3, 4 and 8 there are illustrated various views of an antenna segment of housing 11. As previously mentioned, the present antenna is provided with a means of pressure balance between the cavity in housing 11 and the borehole 2.

It will be appreciated that it is conventional to fill the hollow 25 of housing 11 with a fluid such as oil under pressure from a piston or the like. In this manner, the relatively large pressure differential across the pressure terminal 50 may be compensated for.

With respect to the insulator plug 104, however, as previously noted it will "float" within the slot in the antenna slot element 114, thus serving as an equilizing piston between pressure within the cavity in the housing 11 and pressures encountered in the borehole.

In thus manner, borehole fluid will be prevented from invading the cavity and electrical components housed therein. However, a cover over the slot in antenna slot element 114 of sufficient mechanical strength to withstand such large pressure differentials need not thus be provided.

It is specifically contemplated that this floating piston arrangement formed by the cavity and plug 104 need not be limited to the application depicted herein wherein a strap-type antenna is provided for dielectric logging.

On the contrary, it is specifically contemplated that this concept of the present invention may be applied equally as well to other embodiments wherein a fluid filled cavity-backed aperture or slot is required in a logging tool to be sealed off from borehole fluids and yet a member sealing the cavity from the borehole capable of withstanding the substantial pressure differentials is to be avoided. Thus, the teachings of the present invention might be applied to cavities and slots more typically associated with acoustic logging tools as but one example.

It is contemplated that a suitable strap-type cavity backed slot lumped constant antenna assembly of the present invention may be provided which will operate successfully within a range of between 50 MHz to 1 GHz or even higher, with a frequency of investigation of 200 MHz being selected as a preferred nominal frequency due to several constraints, some of which have been previously discussed. Contrary to suggestions in the literature, the apparatus of the present invention at investigation frequencies below 500 MHz can successfully resolve true dielectric constants of formations notwithstanding that at these lower frequencies the imaginery component of the constant becomes more pronounced.

Although such an antenna assembly may be effectively tuned and loaded within this frequency range, as the frequency is decreased below the nominal value, the optimal physical antenna slot size of a half wave length for the antenna increases. Given the physical constraints of logging tools, however, this, in turn, means that antenna efficiency must be sacrificed for a physicallly realizable slot, inasmuch as at the lower frequencies a greater slot width is required for maximum antenna pickup and transmission.

Conversely, for increasing frequencies beyond the nominal, the wavelength (and thus the theoretical slot width) decreases, giving rise to realizable antenna slots with increased antenna efficiencies. However, as hereinbefore noted, at these increased frequencies formation losses begin to become more substantial, i.e., conductivity of the formation under investigation begins to increasingly contribute more to observed changed in phase and amplitude than the dielectric parameters which are desired to be measured.

Accordingly, it has been determined that a nominal investigation frequency of 200 MHz appears to provide a reasonable depth of investigation beyond the mudcake and into the flushed or invaded zone, whereby measurements less susceptible to borehole rugosity and like effects may be made, a representative such depth being 8 inches or more and the like. Yet such a frequency has also been found to be not so low as to render it impossible to resolve formation conductivity (e.g., aforementioned differences between the real and imaginery components of the dielectric constant), and thus conductivity on the order of a few ohm-meters have been successfully resolved in practice with the present invention.

Referring again to FIGS. 3 and 4, the conductive strap 90 may be thought of primarily as a strap inductor which is tuned and matched by means of lumped constant capacitive or inductive elements such as capacitors 96 and 98. It is located adjacent the slot element 114 so as to be tightly coupled to the slot whereby the induced current is near the slot in the element 114. In this manner, a lumped element or lumped constant resonant circuit is formed wherein the strap 90 may be thought of as a loaded strap resonator. This assembly is thus to be clearly distinguished conceptually from assemblies such as that of the '910 patent wherein a cavity backed slot has the cavity loaded with a dielectric material fed from a probe or the like, such arrangement being known in the electrical arts, in contradistinction as a distributed parameter circuit.

With respect to the various dimensions of the components of the assembly described herein such dimensions have been provided for a particularly suitable embodiment of the present invention. However, it will be appreciated that such dimensions may vary without departing from the scope of the present invention depending upon numerous factors well known in the art. For example, it will be noted that the slot in antenna slot element 114 is not of the theoretically desirable half wave length but rather is substantially smaller giving rise to less than optimal antenna efficiency. However, it will further be noted that this slot width had to be decreased to a nominal width of 2.5 inches in order to yield a cavity of reasonable dimensions to be disposed within the antenna housing 11. However, the relative dimensions may be varied in accordance with principles well known in the art depending upon differing design constraints without departing from the teachings of the subject invention.

Referring now to FIG. 8, although this is a depiction of one half-section of the antenna housing 11, two such symmetrical half-sections are actually provided in mating engagement so as to form the housing 11. An inner cylindrical aperture 20 is machined through the housing 11 in coaxial alignment with a slightly larger cylindrical intermediate recess 22, thereby forming an inner face 26. Disposed axially outward from the aperture 20 and recess 22 in the body of housing 11 is an even larger outer cylindrical aperture 24 which defines an intermediate face 28. Still further axially outward from the aforementioned apertures and recess a substantially flat outer face 30 is machined in the housing 11. A cavity within housing 11 is thereby formed by apertures 20, 24 and recess 22 in concert, with nominal dimensions of the various aspects of the embodiments of housing 11 presently being described and being seen depicted in FIG. 8.

With reference to FIGS. 3 and 8, four threaded mounting bolt apertures 130–136 are machined into the outer face 30. Similarly, two threaded bolt apertures 32 and 34 are machined into the intermediate face 28.

Figure 7:
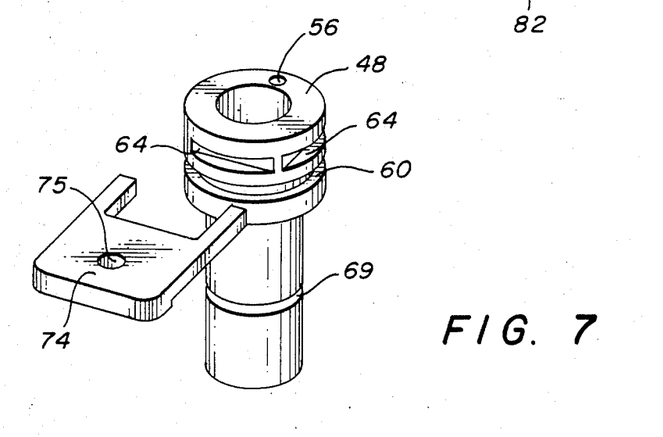
FIG. 7 is still another pictorial view of the portion of the tool depicted in FIG. 4.

Referring now to FIG. 7, a pressure terminal holder 48 is provided having a threaded lug recess 56 in one end and four recesses 64 machined on the sides thereof in quadrature. A clamp 74 may thereby be disposed about the pressure terminal holder 48 with end portions extending into the recesses 64 so to securedly affix the holder 48 in a desired location to be described shortly. Finally, the pressure terminal holder 48 will be provided with an O-ring recess 60 and an RFI gasket recess 69.

In a comparison of FIGS. 4, 7 and 8, the pressure terminal holder 48 will be seen disposed within the inner aperture 20 and the intermediate recess 22. An RFI gasket 68 and O-ring 66 are placed in their respective RFI gasket and O-ring recesses 69 and 60. In FIG. 4, it can be seen that the clamp 74 has been positioned in a manner whereby a bolt 76 may extend through the aperture 75 in clamp 74 into bolt hole 34 so as to hold the clamp 74—terminal holder 48 assembly in a fixed position relative to the antenna housing 11 inside the cavity.

With reference to FIG. 4 in more detail now, a ceramic high pressure and temperature feed through terminal 50 extends through the cylindrical hole in the terminal holder 48. At the uppermost end of the ceramic terminal 50 an electrical contact 72 extends upwards and outwardly therefrom. Intermediate of both ends of the terminal holder 48 and surrounding the ceramic terminal 50, an O-ring 57 is provided for sealingly engaging the inner cylindrical surface of the terminal holder 48. At the lowermost end of the ceramic terminal 50, an additional electrical contact 70 is provided to which is soldered a length of semi-rigid coax cable 44, the solder joint being preferably surrounded by a heat shrink tubing insulation. Also, at the lower end of the ceramic terminal 50 and the terminal holder 48, a coax holder 46 will be disposed. Holder 46 is threadedly received by the terminal holder 48 and has a cylindrical aperture therethrough through which the length of coax 44 extends. The coax 44 will be routed to appropriate transmitter or receiver circuitry (not shown) preferably contained within the hollow 25 formed by the half-sections of the antenna housing 11.

Figure 6:
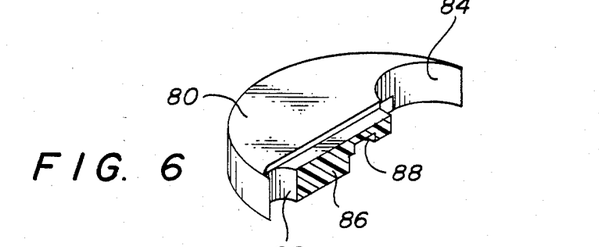
FIG. 6 is a pictorial fragmentary view of yet another portion of the tool depicted in FIG. 4 in half-section.

A split section of a filler plug 80 is shown in FIG. 6. For illustrative purposes, the plug is therein depicted in half-section, however, the plug 80 is actually of an integral one piece construction having a mating half-section which is the mirror image of and symmetrical with the half-section depicted in FIG. 6. The plug 80 in the embodiment presently being discussed preferably has a nominal diameter of 2.275 in. and a thickness of 0.40 in. This filler plug 80 is preferably fashioned of a material known as Peek-PrR-1044 which is available from the Alpha Precision Plastic Company and has a nominal dielectric constant of about 3.5. The plug 80 has provided at one radially outward edge thereof a plug aperture 82. Disposed at the diametrically opposed side of plug 80, yet an additional and larger plug aperture 84 is provided. Running along the upper surface of the plug 80 and interconnecting the two aforementioned apertures 82 and 84 is an elongate and generally rectangularly shaped groove 86 having a depth of 0.062 in. and a width of 0.30 in. Finally, in the underside of the plug 80 a bolt recess 88 is provided.

Referring back to FIG. 4 now, the plug 80 will be placed within the outer aperture 24 (see FIG. 8) with the apertures 82 and 84 in mating alignment, respectively, with threaded bolt hole 32 and intermediate recess 22. It may now be seen that the purpose of recess 88 in plug 80 is for accommodating the clamp 74 and the head of bolt 76 which extends axially outwards from the intermediate face 28.

A metallic strap 90 shown in FIGS. 3 and 4 and fashioned from copper or the like is machined so as to matingly fit the groove 86 in plug 80 and have approximately the same nominal dimensions. With reference to FIGS. 3 and 4, a spacer 94 is placed within the plug aperture 82 and a bolt 92 threadedly received by the threaded bolt hole 32 in the antenna housing 11 (see FIG. 8) whereby this metallic strap 90 and the plug 80 will be securely fastened within the outer aperture 24 to housing 11.

Still referring to FIG. 3, a matching capacitor 96 having a value of 12 pf is electrically interconnected between strap 90 and the contact 72 of ceramic terminal 50. In like manner, a tuning capacitor 98 of 27 pf is electrically interconnected between the metallic strap 90 and a lug 100. A lug bolt 102 is inserted through the lug 100 and threaded received by the threaded lug recess 56 in the pressure terminal holder 48 (see FIG. 7) so as to provide good electrical contact between one end of the capacitor 98 and the terminal 48. A metallic antenna slot element 114 (seen in half-section in FIG. 5 and partially cut away in FIG. 3) is of a generally rectangular shape having nominal dimensions of 2.89 in.×2.50 in. which fits flush up against the outer face 30 machined in the antenna housing 11 as shown in FIG. 8. This antenna slot element 14 is provided with four mounting bolt apertures 130–136. When the antenna slot element 14 is placed on the face 30 of the antenna housing 11, these apertures are in mating alignment with the corresponding mounting bolt apertures 130–136 machined in the face 130. Four antenna slot mounting bolts 138–144 are threadedly received by the apertures 130–136 in the face 30 so as to hold the antenna slot element 114 in position on the antenna housing 11 as depicted in FIG. 2.

Figure 5:
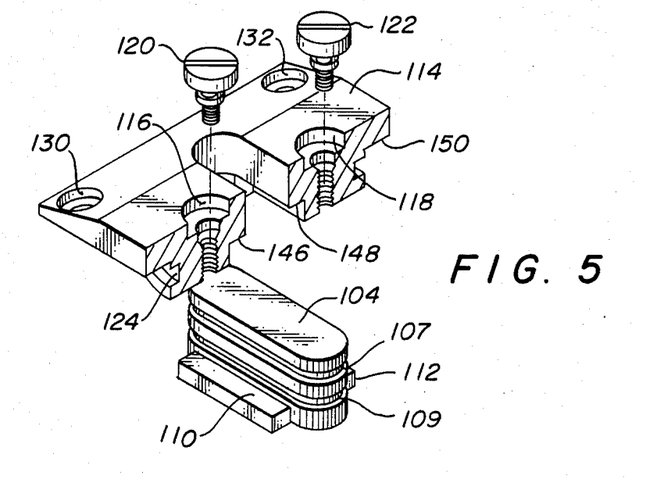
FIG. 5 is an exploded view of a portion of the tool depicted in FIG. 4.

FIG. 5 is a more detailed pictorial illustration of the antenna slot element 114. As with the plug 80 of FIG. 6, it will be appreciated that the antenna slot element 114 is shown in half-section and that the omitted half-section is the symmetrical image of that depicted in FIG. 5 whereby in actuality the antenna slot element 114 is a substantially rectangular plate as shown in FIG. 2.

With reference to FIG. 5 in more detail, the antenna slot element 114 is provided with two threaded filler plug apertures 116 and 118 which threadedly receive filler plugs 120 and 122. The purpose of these filler plugs 120–122 is so that when all components of the tranmsitter or receiver assembly are interconnected in the manner of the present invention, the filler plugs 120 and 122 may be removed. Upon removal of plugs 120–122 the remaining interstices within the cavity defined by the antenna slot element 114, the apertures 20 and 24, the recess 22 (see FIGS. 4 and 8) and the like, may be filled with a low loss fluid or semi-solid with a nominal dielectric loss tangent of 0.05 or the like by means of the apertures 116 and 118 for purposes to be hereinafter described. In practice it has been found that a commercially available silicon oil will perform adequately and preferably a silicon grease.

Still referring to FIG. 5, the antenna slot element 114 on the underside of the relatively rectangular or square-appearing upper plate is generally circular in shape and defines an O-ring groove 124 extending about the periphery of this circular shape. This groove 124 receives a mating O-ring 126 as shown in FIG. 4 whereby this outer circular periphery of the antenna slot element 114 is sealingly mated to the inner cylindrical wall defining the outer aperture 24 in the antenna housing 11.

Also referring to FIG. 5, an antenna insulator plug 104 is provided which may also be preferably fashioned of the Peek-PR-1004 plastic material. Plug 104 has disposed about the periphery thereof two O-ring recesses 107 and 109 and further includes two shoulders 110 and 112. The antenna slot element 114 on the underside thereof has faces 146 and 148 machined therein whereby they will matingly receive corresponding respective shoulders 110 and 112 of the antenna insulator plug 104.

Referring back to FIG. 4, it will be noted that the slot provided in the antenna slot element 114 is dimensioned so as to tightly receive the antenna insulator plug 104 whereby the O-rings 106 and 108 will tightly and sealingly engage the inner surface of the antenna slot element 114 defining the slot therein. Accordingly, both the slot in element 114 and the plug 104 are of the same general shape with a nominal width of 0.5 in. and a length of 1.646 in. Addtionally, the plug 104 may preferably be approximately 0.56 in. thick. In this manner, the shoulders 110 and 112 will, in like manner, engage their respective faces 146 and 148. Finally, with respect to FIG. 5 and the antenna slot element 114, a flat underside face 150 is provided which will mate flush up against the outer face 30 machined in the antenna housing 11.

At higher investigation frequencies on the order of 1.1 GHz and higher, the half wavelength is so small that distributed parameter antennas are feasible in a logging tool. In this form, a "self" resonant cavity-backed slot antenna may be employed wherein the cavity is resonated by filling or "loading" it with a dielectric material which may have a relatively low dielectric constant. This is possible because the slot length may approach the half wavelength, which is the condition for efficient antenna operation.

However, as previously pointed out, in lower nominal investigation frequencies of the present invention, such as at 200 MHz (wherein the aforementioned problems of the borehole acting as a waveguide and the like are avoided), the half wavelength is much greater than any feasible slot length providable in a logging tool. This would normally result in an extremely inefficient radiator, inasmuch as for distributed parameter antennas, as aforementioned, materials with dielectric constants on the order of 100 or the like, are not available to permit reducing the slot length by loading the antenna cavity.

Accordingly, with the present invention, an inductive element such as a metallic strap with good electrical coupling to the adjacent slot in slot element 114 resulting from its close proximity thereto, may be resonated by discrete reactive components forming a lumped constant resonating means interconnected thereto. This permits the elongate dimension of the slot at the lower frequencies to be substantially smaller than the wavelength at these relatively lower investigation frequencies, e.g., on the order of 1/10th the wavelength.

Thus, it will be appreciated that the term lumped constant or lumped element cavity-backed slot antennas or a cavity-backed slot antenna resonated with lumped or constant elements refers to an antenna of the present invention wherein an inductive element adjacent the slot is resonated with discrete reactive components such as the capacitors described herein by means of interconnection thereto. This is to be distinguished from antennas previously discussed wherein the cavity is filled or loaded, e.g., resonated with a continuum of a dielectric material filling the cavity.

It is therefore apparent that the present invention is one well adapted to obtain all of the advantages and features hereinabove set forth, together with other advantages which will become obvious and apparent from a description of the apparatus itself. It will be understood that certain combinations and subcombinations are of utility and may be employed without reference to other features and subcombinations. Moreover, the foregoing disclosure and description of the invention is only illustrative and explanatory thereof, and the invention admits of various changes in the size, shape and material composition of its components, as well as in the details of the illustrated construction, without departing from the scope and spirit thereof.

The embodiments of the invention in which an exclusive property or privilege is claimed is defined as follows.

1. An antenna for subsurface use in investigating an earth formation traversed by a borehole, comprising:
   an antenna housing defining a generally cylindrical cavity therein and a slot,
   said housing being selectively positionable against the wall of said borehole, and
   said slot being elongate in a direction defined by a plane perpendicular to said borehole when said housing is positionable against said borehole wall;
   an inductive element positioned within said cavity and adjacent said slot having first and second ends, said first end being grounded to said housing;
   a resonator means interconnected to said second end of said inductive element for forming an electrically resonating circuit with said inductive element, said cavity, and said slot at a preselected frequency; and
   an insulator plug fluid sealingly disposed and moveable within said slot for providing pressure balancing between said cavity and the borehole.

2. The apparatus of claim 1, wherein said inductive element is an elongate strap inductance.

3. The apparatus of claim 2, wherein said strap inductance extends in a direction generally perpendicular to said slot.

4. The apparatus of claim 3, wherein said resonator means is comprised of lumped elements.

5. The apparatus of claim 4, wherein said lumped elements comprise at least one discrete capacitive component.

6. The apparatus of claim 1, wherein said resonator means is interconnected to a receiver means for detecting electromagnetic energy at said preselected frequency incident upon said antenna from said formation.

7. The apparatus of claim 1, wherein said resonator means is interconnected to a transmitter means for delivering electromagnetic energy at said preselected frequency to said antenna.

8. The apparatus of claim 1, wherein said plug is movable within said slot in a direction perpendicular to said direction defined by said plane.

9. The apparatus of claim 8 further including a fluid filling said cavity.

10. A cavity-backed slot antenna for subsurface use in investigating earth formations traversed by a borehole, comprising:
    an antenna housing member; and
    at least one antenna means adapted to contact the wall of said borehole when carried by said housing member for transmitting into or receiving from said formation, respectively, electromagnetic energy of a preselected frequency, said antenna means being comprised of
    an outer aperture defined by said housing;
    a feed through terminal having an electrical contact extending into said outer aperture;
    a filler plug within said aperture;
    an antenna slot element disposed on said housing and defining with said outer aperture an electrically resonant cavity, said slot element further defining an elongate slot therein extending in a direction perpendicular to said borehole;
    an antenna insulator plug slidably disposed within said slot; and
    an inductive element carried on said filler plug adjacent said slot in said antenna slot element and in electrical contact with said housing at one end of said inductive element and in electrical contact with said terminal contact at the other end of said inductive element.

11. The apparatus of claim 10, wherein
    said housing has a longitudinal hollow extending therethrough and an inner aperture interconnecting said outer aperture to said hollow; and
    said at least one antenna means further includes a pressure terminal holder disposed within said inner aperture with said feed through-terminal extending within said pressure terminal holder, said pressure terminal holder being in sealing engagement with a wall defined by said inner aperture and in sealing engagement with said pressure terminal to prevent fluid flow between said hollow and said cavity.

12. The apparatus of claim 11, wherein said antenna slot element is in sealing engagement with said housing and is in sealing engagement with said antenna insulator plug to prevent fluid flow through said slot.

13. The apparatus of claim 12, wherein at least a portion of said insulator plug is sealingly and slidably movable within said slot in an amount sufficient to equalize a fluid pressure differential between said cavity and said borehole.

14. The apparatus of claim 13, further including:
    a coaxial conductor cable disposed within said hollow; and
    wherein said feed through terminal further includes a second electrical contact interconnected to said cable.

15. The apparatus of claim 10, wherein said inductive element is an elongate inductive strap.

16. The apparatus of claim 15, wherein said inductive element extends in a direction generally perpendicular to said slot.

17. The apparatus of claim 16, wherein said filler plug includes an elongate upper groove for receiving said inductive element.

18. The apparatus of claim 10, wherein said antenna means includes:
    a resonator means interconnected between said terminal contact and said other end of said inductive element for electrically resonating said cavity at said preselected frequency.

19. The apparatus of claim 18, wherein said resonator means is comprised of lumped elements.

20. The apparatus of claim 19, wherein said lumped elements comprise at least one discrete capacitive component.

21. The apparatus of claim 20, wherein said cavity is filled with a fluid.

22. The apparatus of claim 13, wherein said filler plug, said insulator plug, and said fluid have a low dielectric constant.

23. The apparatus of claim 10, wherein said elongate slot has a length substantially smaller than one half the wavelength of said preselected frequency.

24. The apparatus of claim 23, wherein said elongate slot has a length of about 1.65 inches.

25. In a cavity backed slot antenna disposed in a housing for investigating subsurface earth formations traversed by a borehole, said antenna having a fluid filled cavity and an adjacent slot defined by said housing, means for equalizing fluid pressure differential across said slot between said cavity and said borehole, said means comprising:

plug means disposed at least partially, and movable within said slot for transmitting fluid pressure from fluid in said borehole through said slot to said cavity while preventing flow of said borehole fluid into said cavity, said plug means being slidable within and sealingly engagable with a corresponding portion of said housing defining said slot.

26. The apparatus of claim 25, further including:

at least one O-ring extending about the periphery of said plug means in slidably sealing engagement with said portion of said housing defining said slot; and wherein said plug means further includes at least one shoulder means for permitting movement of said plug means at least partially toward said cavity while preventing movement of said plug means away from said cavity upon engagement of said shoulder means with said housing.

* * * * *